US009070141B2

(12) United States Patent
Hua et al.

(10) Patent No.: US 9,070,141 B2
(45) Date of Patent: Jun. 30, 2015

(54) UPDATING FEATURES BASED ON USER ACTIONS IN ONLINE SYSTEMS

(71) Applicant: Facebook, Inc., Menlo Park, CA (US)

(72) Inventors: Ming Hua, Mountian View, CA (US); Hong Yan, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 393 days.

(21) Appl. No.: 13/690,254

(22) Filed: Nov. 30, 2012

(65) Prior Publication Data

US 2014/0156744 A1 Jun. 5, 2014

(51) Int. Cl.
*G06Q 10/10* (2012.01)
*G06Q 30/02* (2012.01)
*G06Q 50/00* (2012.01)

(52) U.S. Cl.
CPC ............ *G06Q 30/0251* (2013.01); *G06Q 50/01* (2013.01)

(58) Field of Classification Search
USPC ......................................................... 709/204
See application file for complete search history.

(56) References Cited

U.S. PATENT DOCUMENTS

| 2009/0089308 A1* | 4/2009 | Beadle et al. ................. 707/101 |
| 2011/0313942 A1* | 12/2011 | Higgins ........................ 705/321 |
| 2012/0158928 A1* | 6/2012 | Naddeo ......................... 709/221 |

\* cited by examiner

*Primary Examiner* — Tu Nguyen
(74) *Attorney, Agent, or Firm* — Fenwick & West LLP

(57) ABSTRACT

Online systems, for example, social networking systems store features describing relations between entities represented in the online system. The information describing the features is represented as a graph. The online system maintains a cumulative feature graph and an incremental feature graph. Feature values based on recent user actions are stored in the incremental graph and feature values based on previous actions are stored in the cumulative graph. Periodically, the information stored in the incremental feature graph is merged with the information stored in the cumulative feature graph. The incremental graph is marked as inactive during the merge and information based on new user actions is stored in an active incremental feature graph. If a request for feature information is received, the feature information obtained from the cumulative feature graph, inactive incremental feature graph and the active incremental feature graph are combined to determine the feature information.

20 Claims, 9 Drawing Sheets

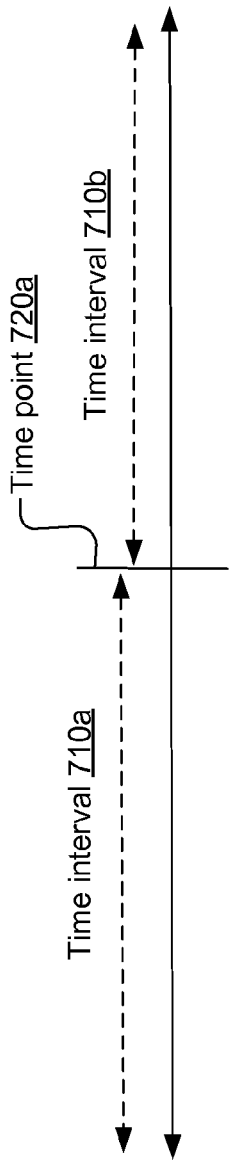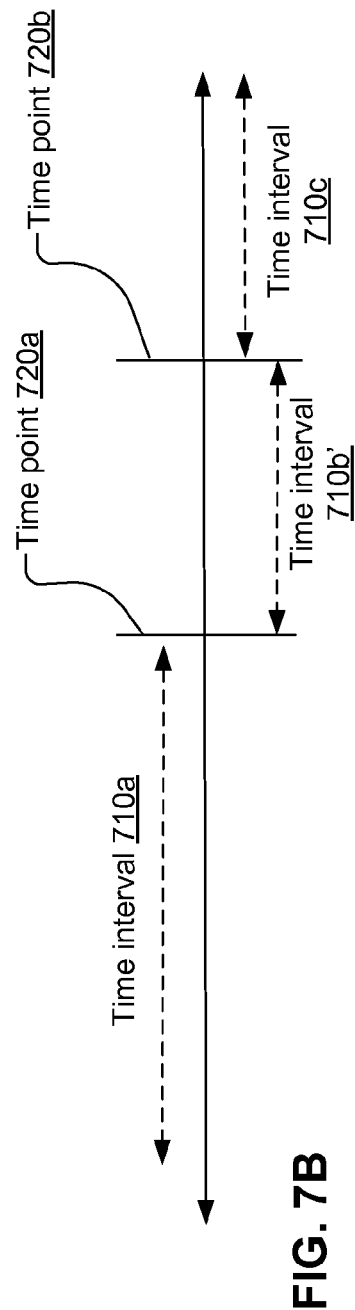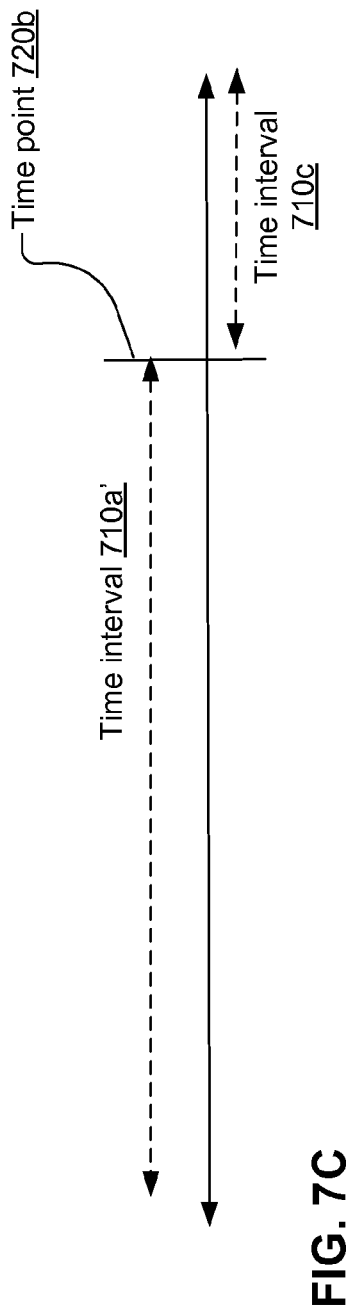
FIG. 7A
FIG. 7B
FIG. 7C

UPDATING FEATURES BASED ON USER ACTIONS IN ONLINE SYSTEMS

BACKGROUND

This invention relates to updating features describing user actions in online systems, for example, social networking systems, and in particular real-time updates to features based on user actions in online systems.

Online systems often present information useful to users and allow users to interact with the online system. Online systems may use various techniques to determine information that is likely to be of interest to a user before presenting the information to the user. Users are more likely to visit the online system regularly if they are presented with information they like. Online systems often earn revenue from advertisements. Advertisers prefer to advertise in online systems that are regularly visited by their users. Therefore, user loyalty may determine revenues generated by an online system. As a result, the ability of an online system to present interesting information to users typically affects the revenue earned by the online system.

Online systems often use past user actions for making decisions regarding actions taken by the online systems. For example, past user behavior may be used by an online system to suggest information to the user that a user may find interesting. An example of an online system is a social networking system that allows users to establish connections with each other. A social networking system may use past user actions to identify news feed stories that may be of interest to a user or to identify potential friends of a user for recommending to the user. Online systems may use predictor models for determining information of interest to a user, for example, machine learning models. These models predict actions based on features describing users and their actions in the online system.

Online systems can often have a large number of users, for example, tens or hundreds of millions of users, who interact on a regular basis with the online system and generate a large amount of information in the online systems. The information generated is used to determine the values of features used by the models of the online system or various modules that make decisions based on the features. Typically, online systems maintain features based on a set of user actions that were taken in the past. Updating the features can be a computation intensive and complex operation. Therefore, the feature values may not be updated very frequently. As a result, recent changes in the patterns of interactions with the online system may not be reflected in the features until quite late. For example, if the user interface of an online system is changed, the user interactions with the online system may change significantly. Similarly, if there is a change in the technology, the user interactions with the online system may change significantly. For example, if an online system that was previously not accessible via mobile devices becomes accessible via mobile devices, the users may interact with the online system in new ways that may not have been previously possible or may not have been popular. However, if the feature values of the online system do not reflect these recent changes, the decisions made by the online system based on feature values do not reflect the recent changes in the user behavior. As a result, online system may take actions that are not relevant to users any more or the online system may present information that is not interesting to the users.

SUMMARY

Embodiments of the invention allow an online system to store information describing entities and interactions between entities represented in the online system. For example, a social networking system may store information describing interactions between a user and a friend of the user in the social networking system. The information may be stored as features such that each feature is associated with a source entity, a target entity, and a value based on user actions representing interactions between the source and the target entity. A cumulative feature store stores feature values based on an aggregate information describing past user actions and an incremental feature store stores feature values based on recent user actions. The information in the incremental feature store is merged with the information in the cumulative feature store. During the merge operation, the incremental feature store is marked as inactive and updates to the incremental feature store based on new user actions are stopped. A new incremental feature store is used to store feature values based on user actions received during the merge operation. The merge operation is repeated, for example, on a periodic basis.

The incremental feature store may be used as the new incremental store for the next iteration. In an embodiment, the incremental feature store is a data store that has faster data access compared to the data store used as the cumulative feature store. For example, the incremental feature values may be stored in a random access memory while the cumulative feature values are stored in a flash memory. In an embodiment, if a request for a feature value is received, the corresponding information from the incremental feature store, new incremental feature store, and the cumulative feature store are combined to determine the requested feature value.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIGS. 7A-7C illustrate the time intervals associated with a cumulative feature store and incremental feature stores, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
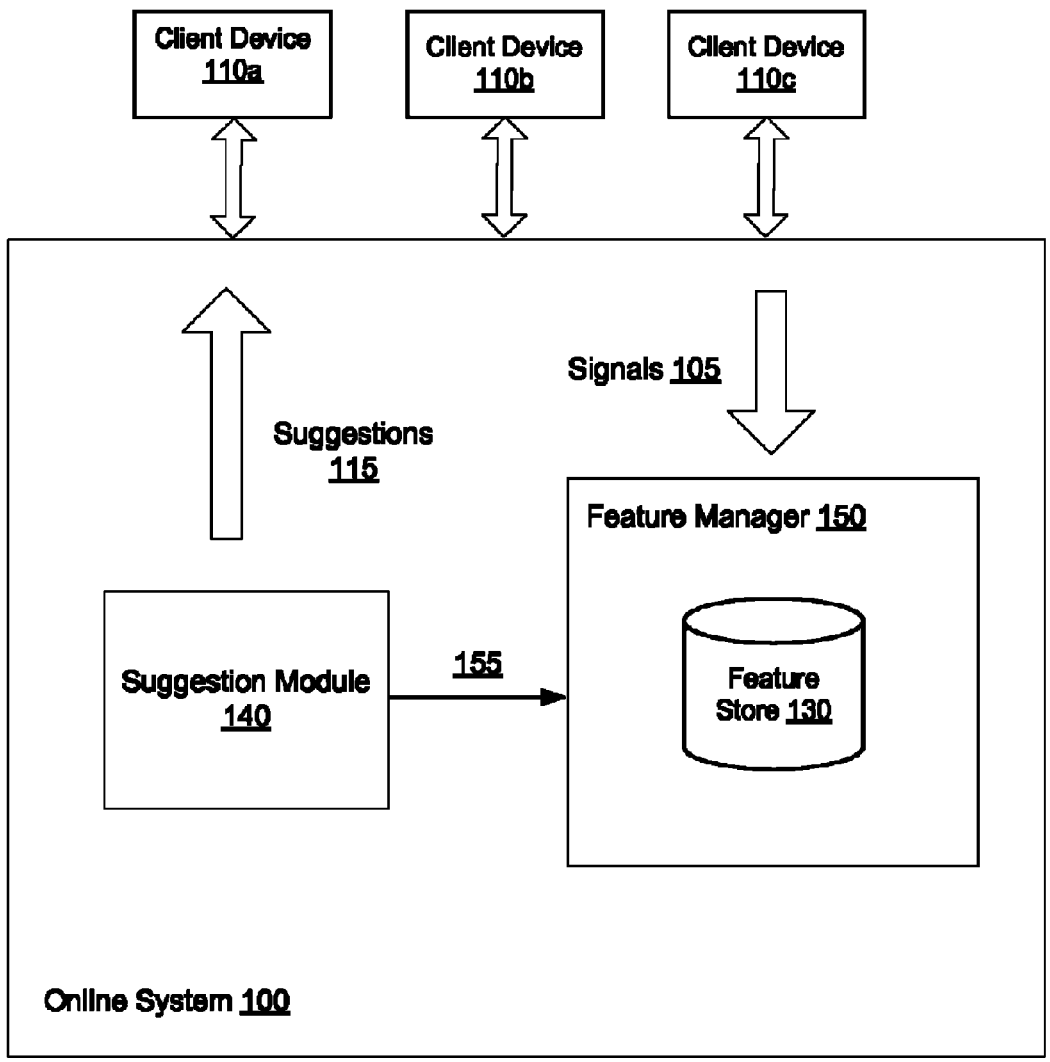
FIG. 1 is a diagram of a system environment for maintaining features based on user actions for use in an online system, for example, social networking systems, in accordance with an embodiment of the invention.

FIG. 1 is a diagram of a system environment for maintaining features based on user actions for use in an online system, for example, social networking systems, in accordance with an embodiment of the invention. The inventions discussed herein, although illustrated using social networking systems, are applicable to any online system that allows users to interact with the online system. Specifically, a social networking system offers its users the ability to communicate and interact with other users of the social networking system. Users join the social networking system and then add connections to a number of other users to whom they desire to be connected. As used herein, the term "friend" refers to any other user to whom a user has formed a connection, association, or relationship via the social networking system.

FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

The users interact with the social networking system 200 using client devices 110. In one embodiment, the client device 110 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smart phone, etc.

The online system 100 receives various signals 105 that represent user interactions with the online system 100. The information describing these signals 105 is stored in the online system as features. A feature can be a value based on information describing users of the online system or interactions of the users of the online system with the online system 100 or entities represented in the online system 100. For example, a feature may describe the closeness between two users of the online system based on a rate of interactions between the two users. A feature may describe a likelihood of a user being interested in certain information based on information describing the user, for example, users interests as specified by the user or user interactions for example, the type of information retrieved by the user in the past. A feature may represent the likelihood of a user accessing a page describing certain information, or the likelihood of a user accessing an image, video, or any other type of content available on the online system 100. In one embodiment, the online system 100 stores a feature vector for pairs of objects in the system, where the feature vector contains a number of features that describe the relationship between the objects. In a social networking system, for example, a feature vector may be stored for a source user's relationship with a target user, where the feature vector contains features such as a measure of the frequency that the source user has viewed information about the target user, initiated a communication with the target user, and various other measures that describe the relationship between the source and target users. A feature manager 150 processes the signals 105 received by the online system 100 to determine various feature values and stores the feature values in a feature store 130.

An online system 100 may use the information available in the feature store 130 for ranking entities represented in the online system. For example, a social networking system may rank different friends of a user to determine a set of close friends. Or the social networking system may rank a set of users associated with a target user to determine a set of potential friends of the target user for suggesting to the target user. The online system may also use the feature values to determine information to be presented to a user.

The online system 100 may present different type of information to the users. For example a social networking system may present to a user, information describing other users, social groups, social events, content, images, and so on. There may be a large number of actions occurring in an online system 100 that are associated with the user. Since a user typically has limited time to spend on the online system 100 and also the amount of space available in a user interface of the online system 100 is typically limited, the online system 100 may select information that is most likely to be of interest to the user for presenting to the user. The online system 100 may incorporate one or more suggestion modules 140 that select information for presentation to the user from various available options.

The suggestion modules 140 may use information available in the feature stores to determine whether a user is likely to perform a desired action based on information presented to the user. For example, the online system may include one or predictor models that predict user behavior. The suggestion module 140 may make suggestions 115 to the users based on the predicted user behavior. A predictor model may be invoked by the suggestion module to make decisions regarding information presented to the user. The predictor models utilize the information available in feature stores for predicting user actions. For example, a predictor model may be trained using feature values available in the feature store 130. As an example, the online system may include a predictor model that determines a likelihood of a user requesting more information related to a newsfeed item presented to the user. Or a predictor model may determine the likelihood of a user commenting on an image presented to the user. Alternatively, a predictor model may determine a likelihood of a user sending a request to connect with a potential connection recommended by the social networking system.

The online system 100 comprises on one or more computer processors executing software modules. Some embodiments of the systems 100 and 110 have different and/or other modules than the ones described herein, and the functions can be distributed among the modules in a different manner than described here. The online system 100 may comprise modules other than those shown in FIG. 1, for example, modules illustrated in FIG. 4 that are further described herein.

Figure 2:
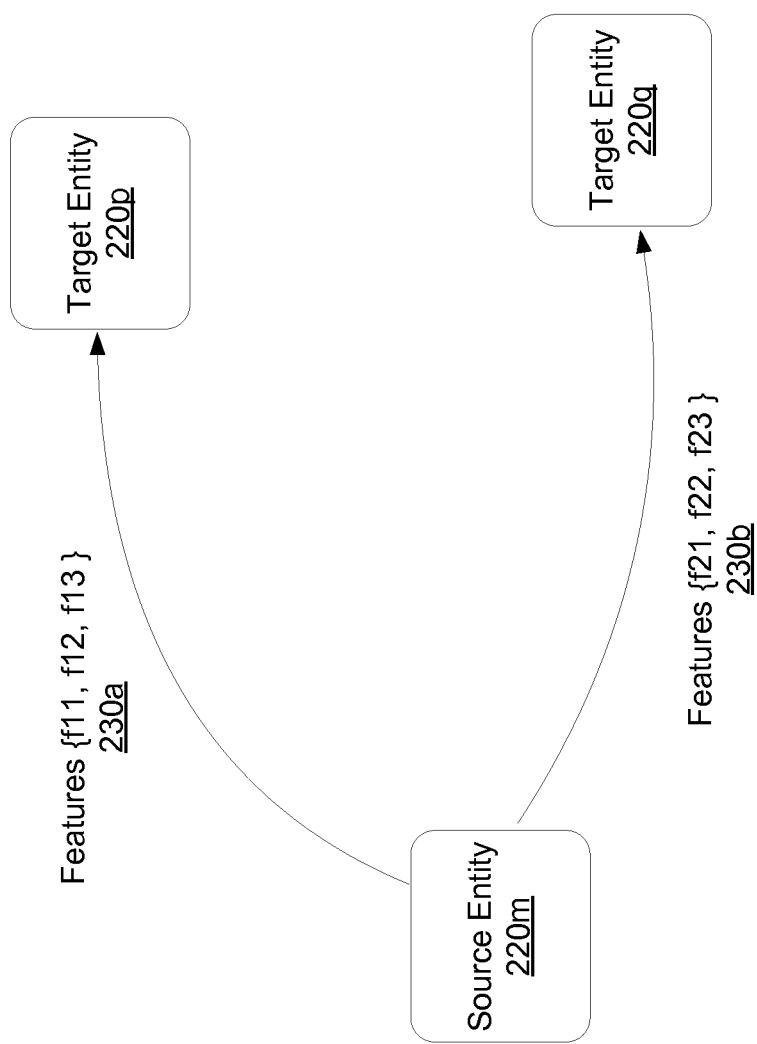
FIG. 2 is a diagram illustrating features representing interactions between two entities represented in an online system, in accordance with an embodiment of the invention.

FIG. 2 is a diagram illustrating features 230 representing interactions between entities 220 represented in an online system, in accordance with an embodiment of the invention. A feature 230 may represent interactions between a source entity and a target entity. For example, features f11, f12, and f13 represent interactions between source entity 220m and 220p and feature f21, f22, and f23 represent interactions between source entity 220m and 220q. For example, features may represent a rate of interactions between two users, how recently two users have interacted with each other, the rate or amount of information retrieved by one user about an entity, or the number and types of comments posted by a user about an entity. The features may also represent information describing a particular entity, for example a user. As an example, a feature may represent the level of interest that a user has in a particular topic, the rate at which the user logs into the online system, or information describing demographic information about a user.

In general, the various features of the online system 100 can be represented as a feature graph. Each feature can be associated with a source entity, a target entity, and a feature value. A feature can be specified as an expression based on values describing the source entity, the target entity, or interactions between the source and target entities. Feature expressions can be composed, i.e., a feature expression can be a function of other feature expressions. An online system can have a large number of users, for example, millions or even hundreds of millions. There can be a very large number of interactions of users with the online system, interactions between the users, and large amount of information describing the users. Therefore a feature graph represented by the online system 100 can get updated constantly based on information that is received on an ongoing basis.

Figure 3:
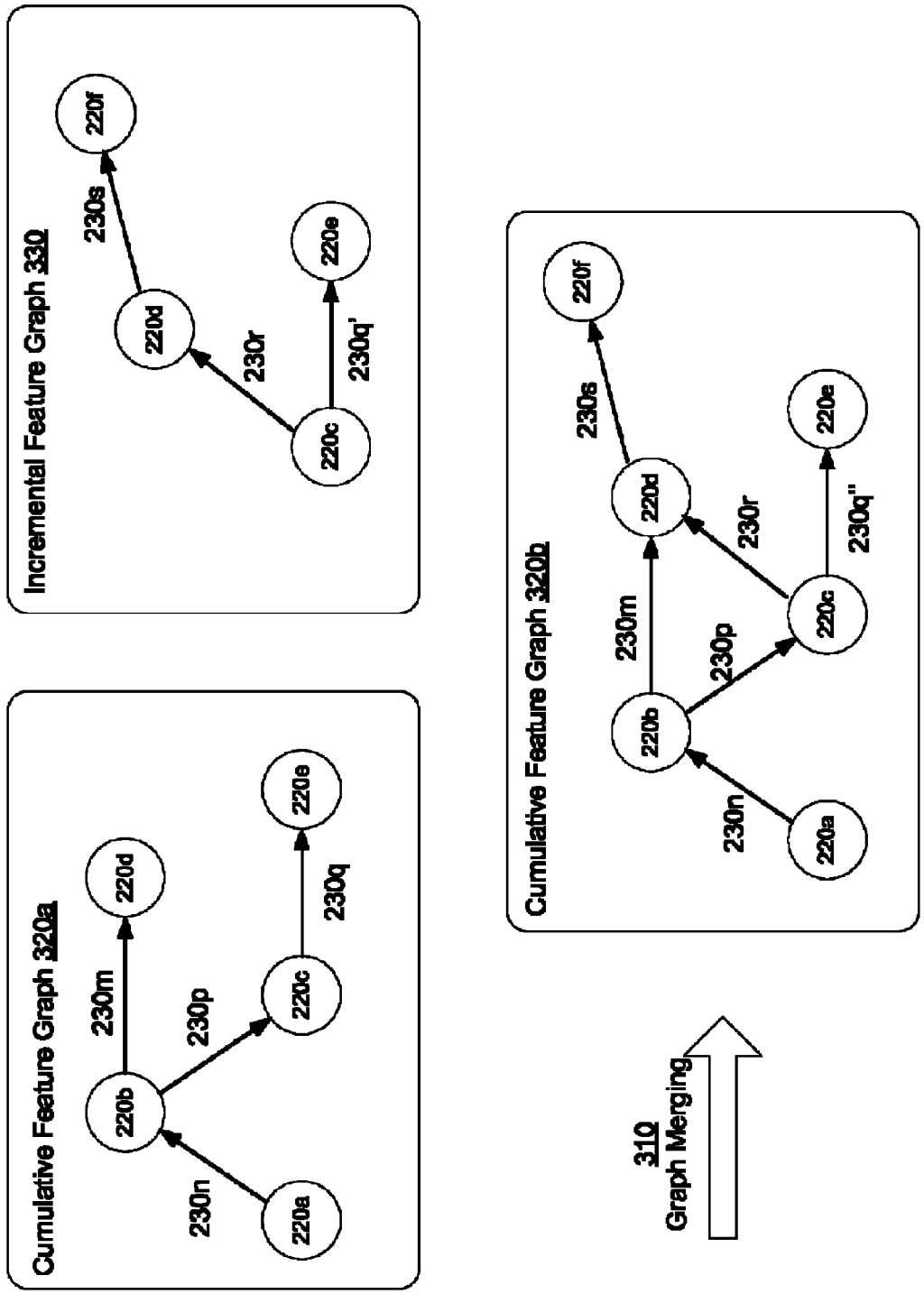
FIG. 3 is a diagram illustrating merging of a cumulative feature graph with an incremental feature graph, in accordance with an embodiment of the invention.

FIG. 3 is a diagram illustrating merging of a cumulative feature graph with an incremental feature graph, in accordance with an embodiment of the invention. The various nodes 220 correspond to entities represented in the online system 100 and an edge 230 from a source entity to a target entity corresponds to features associated with the source entity and the target entity. Cumulative feature graph 320a includes entities 220a, 220b, 220c, 220d, and 220e and edges 230m, 230n, 230p, and 230q. The incremental feature graph 330 represents a feature graph corresponding to user actions recently received by the online system 100, for example, all user actions received since a given time point. The cumulative feature graph 320 represents features based on aggregate information of all user actions that occurred before the given time point. As shown in the incremental feature graph 330, based on the user actions since the given time point, a new entity 220f is introduced and two new edges 230r and 230s are introduced. The incremental feature graph 330 also includes an edge 230q' that modifies the existing edge 230q.

The length of interval of time for which an incremental feature graph 480 accumulates features before the feature values of the incremental feature graph 480 are merged with the cumulative feature graph may be configurable. For example, a system administrator of the online system can determine whether the length of time interval associated with a incremental feature graph is a single day, a few hours, or several days. In an embodiment, the length of time interval is configurable for a particular set of users. Accordingly, the length of time interval for incremental feature store for a particular set of user can be different from another set of users. For example, if a set of users are associated with a higher rate of user actions, the length of time interval for this set of users can be configured to be smaller than a set of users that perform user actions less frequently using the online systems. In an embodiment, the length of time interval for the incremental feature store can be configured for each individual user.

The modified cumulative feature graph 320b is obtained by merging 310 the incremental feature graph 320 with the cumulative feature graph 320a. The modified cumulative feature graph 320b includes the portions of graph from the incremental feature graph 320 as well as the cumulative feature graph 320a. The new entities and edges from the incremental feature graph 320 are includes in the cumulative feature graph 320b. Furthermore, any edge 230q' in the incremental feature graph 320 that corresponds to an existing edge 230q in the cumulative feature graph 320a results in the modification of the existing edge 230q to the edge 230q". The edge 230q" is obtained by aggregating the feature values corresponding to the edge 230q with the feature values corresponding to 230q'. The aggregation of feature values may depend on the feature. Different types of feature may require different operation for merging to component values. For example, the edge 230q may represent a rate at which a source entity requests information from the target entity and the edge 230q may represent frequent requests by the source entity for information from the target entity since the given time point. The communications since the given time point result in modification of the overall rate at which a source entity requests information from the target entity as shown by edge 230q".

The cumulative feature graph 320 is updated during the graph merge operation 310. However, there are no updates to the cumulative feature graph 320 when the merge operation is not being performed. The updates based on recent user actions received by the online system are performed in the incremental feature graph 330. In an embodiment, during the merge 310 operation, the incremental feature graph is marked as inactive and updates to the inactive incremental feature graph are stopped. A new incremental feature graph is used to make updates based on the recent user actions during the merge 310 operation. Since there are no updates to either the cumulative feature graph or the inactive incremental feature graph that are being merged, the merge operation can be performed efficiently. If the two input graphs of the merge operation can be updated during the merge operation, various portions of the graphs may have to be locked, thereby making the merge operation inefficient.

The FIG. 3 shows an example with a few nodes and edges in the cumulative feature graph and the incremental feature graph. However in an online system with a large number of users, both the cumulative feature graph and the incremental feature graph may have a large number of nodes and edges. The cumulative feature graph is available for other modules of the online system 100 to request feature values.

System Architecture

Figure 4A:
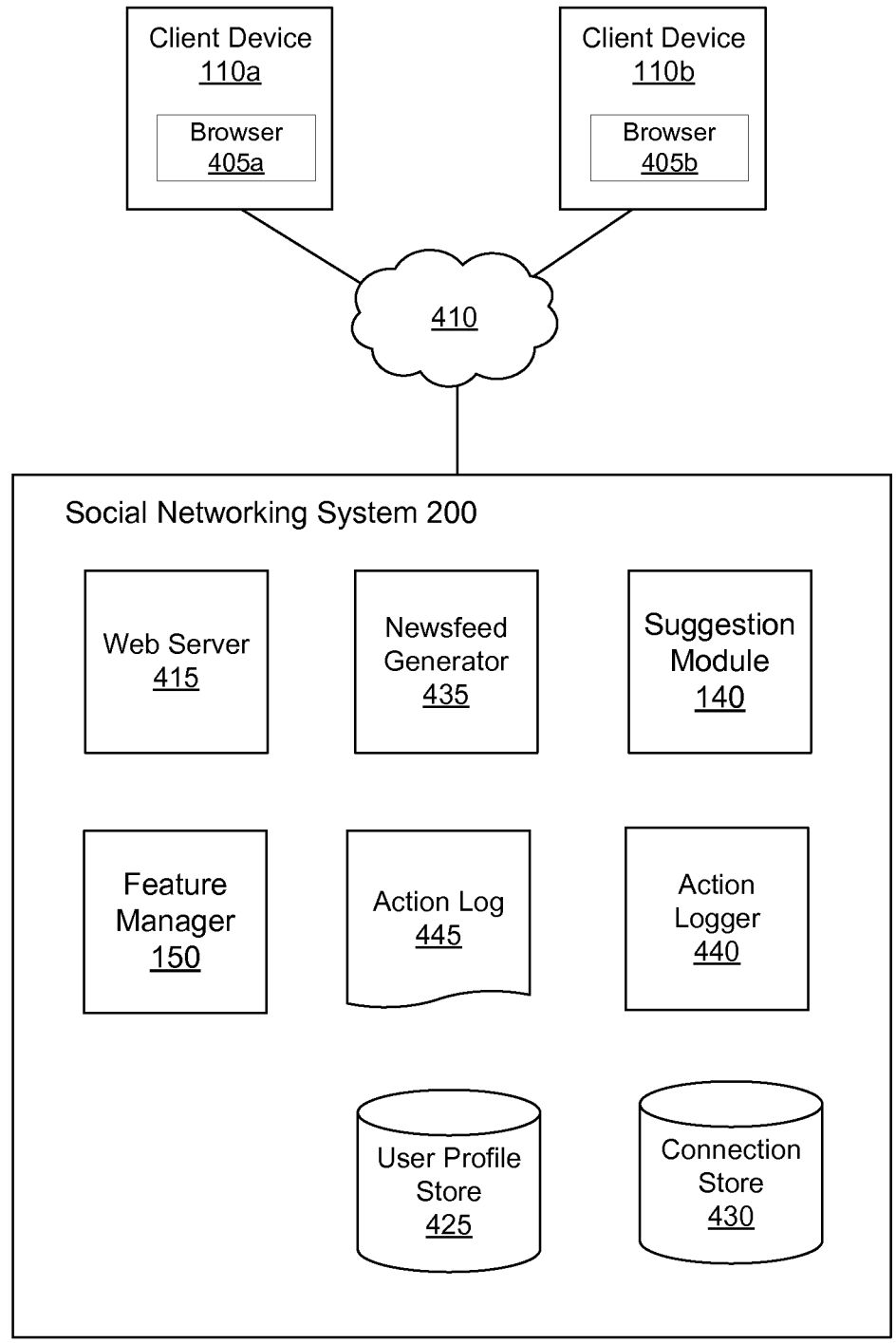
FIG. 4A illustrates a system architecture of an online system, for example, a social networking system that makes features available to other modules for processing as the corresponding user actions are available, in accordance with an embodiment of the invention.

FIG. 4 is a diagram of system architecture of an embodiment a social networking system 200 as an example of an online system 100. Although the social networking system 200 is described herein as an example online system, the principles described herein are applicable to other online systems. The social networking system 200 includes a newsfeed generator 435, web server 415, an action logger 440, an action log 245, a connection store 430, user profile store 425, and suggestion module 140, and a feature manager 150. In other embodiments, the social networking system 200 may include additional, fewer, or different modules for various applications. Conventional components such as network interfaces, security mechanisms, load balancers, failover servers, management and network operations consoles, and the like are not shown so as to not obscure the details of the system.

The social networking system 200 stores user profiles in the user profile store 425. The user profile store 425 stores information describing the users of the social networking system 200, including biographic, demographic, and other types of descriptive information, such as work experience, educational history, gender, sexual preferences, hobbies or preferences, location, and the like. The user profile store 425 may also store content provided by the user, for example, images, videos, comments, and status updates. In an embodiment, a user of the social networking system 200 can be an organization, for example, a business, a non-profit organization, a manufacturer, a provider, and the like. The type of information stored in a user profile of an organization may be different from the information stored in a user profile of an individual. For example, an organization may store information describing the type of business, financial information associated with the organization, structure of the organization and so on. A user can be any type of entity that can be represented in the social networking system 200.

The social networking system 200 allows users to add connections to a number of other users of the social networking system 200 to whom they desire to be connected. Connections may be added explicitly by a user, for example, the user selecting a particular other user to be a friend, or automatically created by the social networking system based on common characteristics of the user (e.g., users who are alumni of the same educational institution). Social networking systems may store information describing connections of a user along with the information specific to the user.

The social networking system 200 stores data describing one or more connections between different members in the connection store 430. The connection information may indicate members who have similar or common work experience, group memberships, hobbies, or educational history. Additionally, the social networking system 200 includes user-defined connections between different users, allowing users to specify their relationships with other users. For example, these user-defined connections allow members to generate relationships with other users that parallel the users' real-life relationships, such as friends, co-workers, partners, and so forth. Users may select from predefined types of connections, or define their own connection types as needed. User information describing each user may include information describing connections of the user. Furthermore, information describing a connection of a user may be accessed in relation to actions performed by a user. For example, if the user posts comments on the social networking system, the social networking system may provide information describing the action to connections of the user. The information may be provided to connections of the user via newsfeed.

The social networking system 200 may associate actions taken by users with the user's profile, through information maintained in a database or other data repository. Such actions may include, for example, sending a message to other users, reading a message from the other user, viewing content associated with the other user, among others. In addition, a number of actions performed in connection with other objects are directed at particular users, so these actions are associated with those users as well.

The action logger 440 is capable of receiving communications from the web server 415 about user actions on and/or off the social networking system 200. The action logger 440 populates the action log 445 with information about user actions to track them. Any action that a particular user takes with respect to another user is associated with each user's profile, through information maintained in a database or other data repository, such as the action log 445. Such actions may include, for example, adding a connection to the other user, sending a message to the other user, reading a message from the other user, viewing content associated with the other user, attending an event posted by another user, among others.

A social networking system 200 maintains a newsfeed channel that provides regular updates of information available in the social networking system 200 to a user. The information reported via the newsfeed channel is determined by the newsfeed generator 435. The newsfeed generator 435 generates messages for each user about information that may be relevant to the user, based on actions stored in the action log 445. These messages are called "stories"; each story is an message comprising one or a few lines of information based on one more actions in the action log that are relevant to the particular member. For example, if a connection of a user performs a transaction, the action may be reported to the user via a newsfeed story. The actions reported via the newsfeed are typically actions performed by connections of the user but are not limited to those. For example, if certain information unrelated to the connections of the user is determined to be useful to the user, the information can be reported to the user via a newsfeed.

The web server 415 links the social networking system 200 via the network 410 to one or more client devices 110; the web server 415 serves web pages, as well as other web-related content, such as Flash, XML, and so forth. The web server 415 provides the functionality of receiving and routing messages between the social networking system 200 and the client devices 110. These messages can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system 200 besides the recipient of the message is a wall post.

The social networking system 200 may provide users with the ability to take actions on various types of entities supported by the website. These entities may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. A user profile may store associations of a user with various entities.

The social networking system 200 may provide various mechanisms to users to communicate with each other or to obtain information that they find interesting, for example, activities that their friends are involved with, applications that their friends are installing, comments made by friends on activities of other friends etc. The mechanisms of communication between members are called channels. If a user communicates with another user, the user information of both users may have to be accessed, for example, to associate the action of communicating with the sender and the receiver.

The feature manager 150 extracts feature values from the signals 105 received by the social networking system 200 corresponding to user actions. The feature manager 150 stores the feature values extracted and provides feature values to various modules of the social networking system 200. The feature manager 150 is described in the description of FIG. 1 and is described in further detail herein, for example, in FIG. 4B.

The suggestion module 140 identifies information of interest to various users and sends the information to them. For example, the social networking system 200 may send to a user, stories describing actions taken by other users that are connected to the user. The story may be communicated to the user via a channel of communication of the social networking system 200, for example, a newsfeed channel. The suggestion module 140 uses information available in the user profiles of various users to determine stories of interest to each user. The suggestion module may use information available in a feature store 130 to determine the information that is presented to a user. In some embodiments, a suggestion module 140 may use predictor models, for example, machine learning models for selecting information presented to a user. These predictor models are trained using data obtained from feature store 130. Various other modules may use information stored in a feature store 130 for making decisions. For example, a module may use information stored in the feature store 130 to select potential friends for a user for suggesting to the user. The newsfeed generator 435 may use information stored in the feature store 130 to select newsfeed items for presenting to the user. The features may be used for various other purposes in an online system, for example, a social networking system may rank various entities for a user, for example, rank friends of a user, potential friends for the user, pages likely to be of interest to the user, content likely to be of interest to the user, search terms for type ahead for a given user, advertisements likely to be of interest to a user and the like.

The client device 110 executes a browser 405 to allow the user to interact with the social networking system 200. The browser 405 allows the user to perform various actions using the social networking system 200. These actions include retrieving information of interest to the user, recommending content to other users, upload content to the social networking system 200, interact with other users of the social networking system, establish a connection with a user of the social networking system, and the like.

The interactions between the client devices 110 and the online system 100 are typically performed via a network 410, for example, via the internet. The network 410 enables communications between the client device 110 and the social networking system 200. In one embodiment, the network 410 uses standard communications technologies and/or protocols. Thus, the network 410 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 410 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 410 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 410 can also include links to other networks such as the Internet.

Figure 4B:
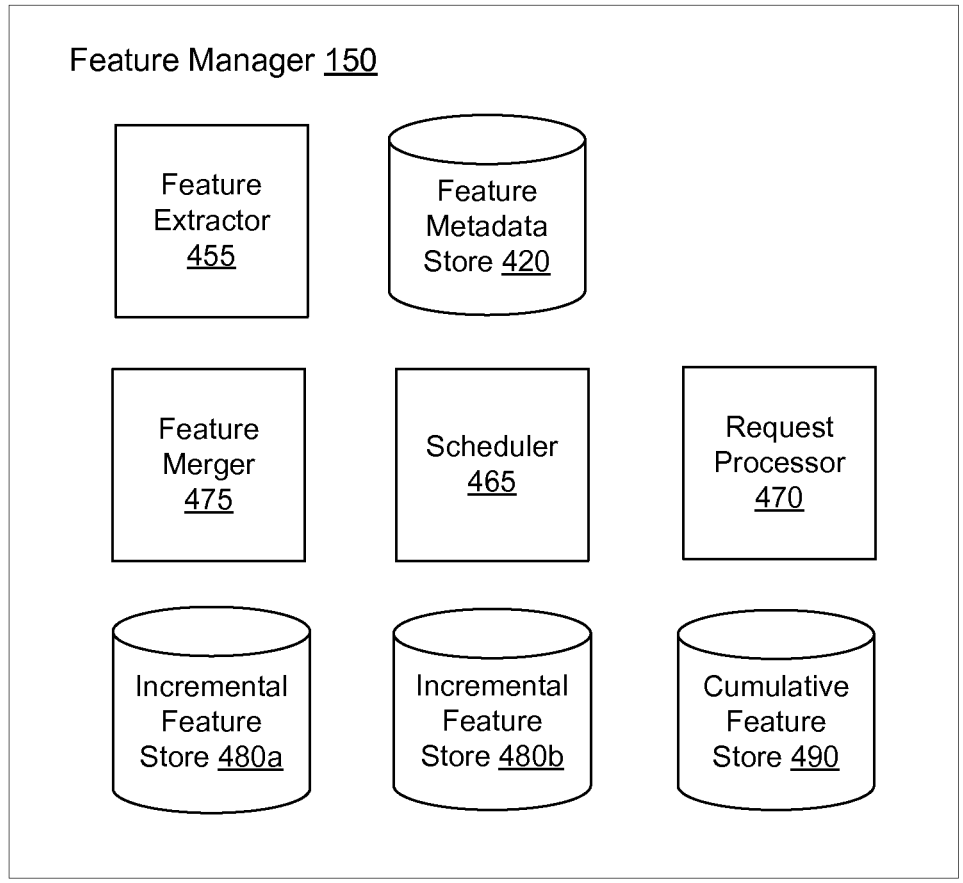
FIG. 4B illustrates sub-modules of a feature manager module that allows management of features in an online system, in accordance with an embodiment of the invention.

FIG. 4B is a diagram of system architecture of the feature manager 150 of the social networking system 200, in accordance with an embodiment of the invention. The feature manager 150 comprises modules including a feature extractor 455, a request processor 470, a feature merger 475, scheduler 465, feature metadata store 420, a cumulative feature store 490, and one or more incremental feature stores 480*a*, 480*b*. The feature manager 150 processes user actions to determine feature values that are stored in feature stores 480, 490. The feature manager 150 receives requests from various modules of the social networking system 200 to provide feature values. In some embodiments, the feature manager 150 may receive requests for feature values from external systems, for example, external systems that invoke functionality within the social networking system via application programming interfaces (APIs.)

The metadata describing various types of features is stored in the feature metadata store 420. A feature may be represented as an expression based on values associated with entities represented in the social networking system 200 and actions performed in the social networking system 200. These expressions representing features can be provided by experts and added to the system by a privileged user, for example, a system administrator. In an embodiment, a feature is represented as a function of actions logged in the social networking system, i.e., feature=function (logged actions). A feature could also be a function of other features, for example, an expression based on other features or actions, or combinations of the two. As an example of a feature as an expression, if the target is a user, and view_profile corresponds to the source user viewing the target user's profile, view_photo corresponds to the source user viewing the target users photo, and view_comment corresponds to the source user viewing a comment posted by the target user, a feature called observation may be defined as follows.

$$observation = view\_profile + view\_photo + 0.5 \times view\_comment$$

In the above equation, a value of a term, say view_profile is 1 if the action occurs and 0 if the action doesn't occur. In another embodiment, the value of each term may be a score value based on information describing the particular action, for example, the number of times the action is performed by the user within a time interval, or a score based on the length of time associated with the action such as a length of time that a user observes a photo before retrieving a different photo.

In an embodiment, a feature can be an aggregate value based on actions performed by the source user with respect to multiple targets. For example, a feature may represent an aggregate of all page views performed by a source user in a given time interval for all other users connected to the source user. Another feature may represent the rate at which a user views images posted by other users connected to the user. A feature may represent an action performed by a source user with respect to a target user that is normalized based on the source user's behavior with respect to all other users connected to the source user. For example, a feature may represent how often a source user interacts with a target user normalized using the average number of interactions of the source user with other users connected to the source user. The feature metadata may specify an expression for combining partial results associated with a feature value. For example, an expression describing a feature may specify how to obtain the feature value by combining partial results of evaluating a feature for two different time intervals.

The feature extractor 455 extracts feature values based on the user actions performed by users of the social networking system 200. The feature extractor 455 extracts features based on metadata describing the feature. In an embodiment, the metadata describing various features is stored in memory of the processors implementing the social networking system 200 for faster access. Each feature type may be associated with certain types of user actions. For example, a feature corresponding to a rate of communication between a source user and a target user may be associated with every communication between the source and the target user. In an embodiment, multiple instances of an action of a particular type that occur within a short time interval are treated as a single instance of the user action. For example, if a user clicks on an image several times within few minutes, the feature manager 150 treats these multiple clicks as a single click action. Similarly, if a user clicks a user interface button indicating the user likes an entity multiple times within a few minutes, the feature manager 150 treats these multiple like signals as a single user action indicating the user likes the entity. These series of user actions are treated as a single user action since the number of instances occurring within a short interval does not convey any significant additional information as compared to the fact that the user action was performed.

When a user action of a particular type is performed by a user, all features associated with the user action may be reevaluated. In an embodiment, an instance of a feature may be stored as various component values that may be combined to determine the feature value. For example, counts of individual communications between two users may be stored for different time intervals. An aggregate rate of communication between the two users may be obtained by combining the different count values based on an expression describing the feature. As another example, if a feature is based on the number of times a user viewed a photo, each instance of the user viewing the photo may cause the feature to be re-evaluated.

In an embodiment, a features table stores the values of various features. For example, the features table may have columns source ID, target ID, type of target, action ID, and various features. In an embodiment, the values for various features may be represented as name value pairs associated with each instance of source and target. In another embodiment, the data generated for a particular predictor model is represented as table I in which each source and target is associated with various features that are relevant to the model.

TABLE I

| Row ID | Source ID | Target ID | Feature F1 | Feature F2 |
|---|---|---|---|---|
| 2001 | 100 | 200 | 20 | 512 |
| 2002 | 100 | 201 | 20 | 630 |
| 2003 | 101 | 202 | 15 | 720 |

The feature stores 480 and 490 store feature values that are extracted by the feature extractor 455. Each feature store 480a, 480b, and 490 stores the feature value for a particular time interval. The cumulative feature store 490 stores feature values based on user actions that occurred before a given time point. For example, at a current time point, the cumulative feature store 490 may store feature values based on user actions that were received yesterday or earlier. In contrast an incremental feature store 480a stores user actions that occurred since the given time point. For example, the feature store may store all feature values based on user actions that occurred today.

The feature values based on current user actions may be determined and stored in the incremental feature store 480a until a given point in time after which the feature values stored in the incremental feature store 480a are merged with the feature values of the cumulative feature store 490. The feature merger 475 performs the merging of the features values from the incremental feature store 480 with the cumulative feature store 490. For example, at the end of each day, the feature merger 475 merges the feature values of the incremental feature store 480 with the cumulative feature store 490.

To avoid updates to the incremental feature store 480a while the feature values are being merged, the incremental feature store 480a is marked as inactive. An inactive incremental feature store 480 is a feature store that is not updated responsive to user actions currently happening whereas an active incremental feature store 480 is a feature store that is updated responsive to user actions currently happening in the social networking system 200. Accordingly the updates to the incremental feature store 480a that is marked inactive are stopped while the information stored in the incremental feature store 480 is merged with the cumulative feature store 490. Once the feature values of an incremental feature store 480 are merged, the incremental feature store 480 is reset, i.e., the incremental feature store 480 is treated as empty. The incremental feature store 480b is marked as active and user actions received result in updates to feature values stored in the incremental feature store 480b. The updates to the incremental feature store 480b may be continued for another time interval until a subsequent point in time is reached. The above process may be repeated, i.e., the incremental feature store 480b marked as inactive for merging the feature values in the incremental feature store 480b with the cumulative feature store 490. In this iteration, responsive to the incremental feature store 480b being marked as inactive, the incremental feature store 480a may be marked as active. At this stage, it is assumed that the information previously stored in the incremental feature store 480a was merged with the cumulative feature store 490 and the incremental feature store 480a reset. Accordingly, the incremental feature store 480a can be used for updating feature values for the new time interval. Accordingly, the status of the two incremental feature stores 480a and 480b can be switched alternatively. In one time interval, the first incremental feature store is marked active and receives updates while the second incremental feature store is marked inactive and is being merged with the cumulative feature store. In the next time interval, the second incremental feature store is marked active and receives updates while the first incremental feature store is marked inactive and is merged with the cumulative feature store. This process can continue while the system 100 or 200 is running. The scheduler 485 schedules tasks for merging an incremental feature store with the cumulative feature store and for changing the status of each incremental feature store at the appropriate time as described above.

In an embodiment, the incremental feature stores 480 are stored in storage of a computer system that has faster access time compared to the access time of a store used for the cumulative feature store 490. Since the cumulative feature store 490 includes a large amount of data, it is stored in a slower but less expensive storage, for example, flash memory. In contrast, the incremental feature store 480 is frequently accessed for updating the features as user actions are performed. Therefore, the incremental feature store 480 is stored in a faster storage, for example, random access memory (RAM). RAM is typically expensive compared to secondary storage and the amount of RAM storage of a computer system is typically less than the amount of secondary storage available, for example, flash memory. Since the amount of data stored in a cumulative feature store 490 can be significant, embodiments partition the information in the cumulative feature store 490 across multiple computers such that a partition is assigned to each computer. For example, a set of users may be assigned to a partition and features associated with the users mapped to the partition.

The request processor 470 receives requests for feature values from various modules of the social networking system 200. The request processor 470 retrieves the feature values and returns the feature values to the requestor. In an embodiment, the request processor 470 retrieves the corresponding feature values from each feature store and combines them to determine an overall feature value. For example, the request processor 470 may receive a request for a feature value of a particular feature type associated with a source entity and a target entity. Each of the feature store 480*a*, 480*b*, and 490 may store a partial result associated with the requested feature based on the user actions that occurred in the time interval associated with each feature store. The request processor 470 retrieves the partial results for the feature value from each feature store and combines the partial results to determine the feature value based on associated user actions received by the social networking system 200.

In an embodiment, the request processor 470 attenuates the partial result values associated with older time intervals to give higher weight to recent data. For example, the partial result obtained from the cumulative feature store may be multiplied by an attenuating factor (also called a decay factor) for determining the combined feature value. The value of the attenuating factor may be configurable, for example, a pre-configured value that is less than one, say 0.9. As a result, the effect of older user actions in the cumulative data store decays over time. For example, if a feature value can be considered as aggregating partial results associated with different time intervals, partial results determined for significantly old time intervals get multiplied by the attenuating factor multiple times whereas partial results for relatively recent time intervals are multiplied by the attenuating factor only a few times. Therefore, user actions associated with older time intervals are weighted less than user actions associated with newer time intervals.

The impact of a user action on a feature value can be considered as decaying exponentially over time. In some embodiments, the value of the decay factor depends on the type of feature. Each feature may be associated with a half life. The value of the half life may be used to determine the decay factor for the feature. For example, some features may have longer half life and other features may have shorter half life. Therefore, features with longer half life have a decay factor that causes the decay of the older values slowly and features with shorter half life have a decay factor that causes the decay of the older values faster.

Overall Process of Storing Feature Values

Figure 5:
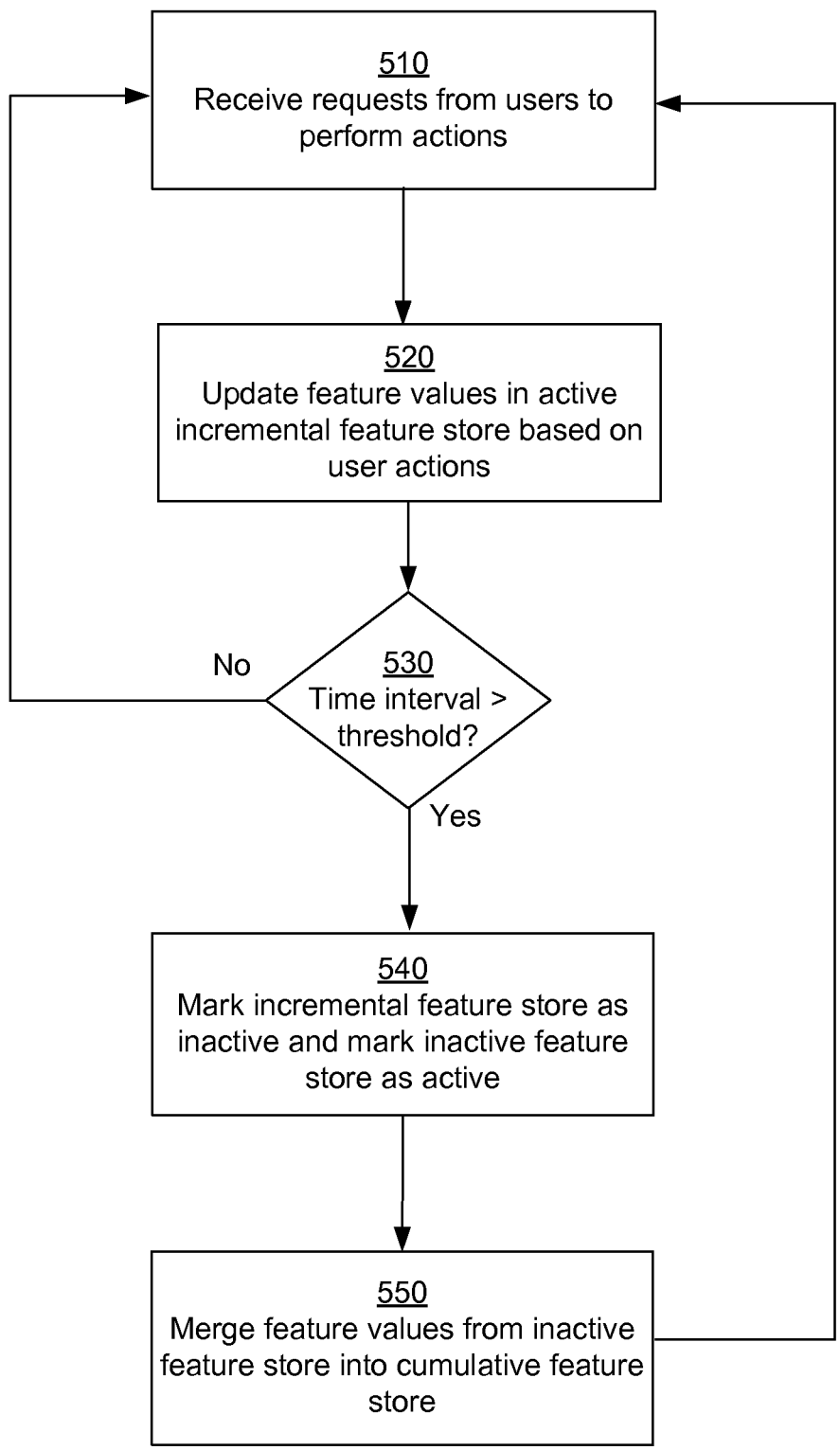
FIG. 5 illustrates an overall process of merging incremental feature stores with cumulative feature store, in accordance with an embodiment of the invention.

FIG. 5 illustrates the overall process of merging incremental feature stores with cumulative feature store, in accordance with an embodiment of the invention. As an example, the incremental feature store 480*a* is assumed to be marked active and incremental feature store 480 marked inactive when the execution of the process illustrated in FIG. 5 begins. The web server 415 receives requests from users for performing various user actions. These actions may be logged by the action logger 440 in the action log 445. The feature extractor 455 may extract feature values or partial results related to feature values based on information describing these user actions. The feature extractor 455 may either obtain the information describing these user actions from the action logger 440 as the user actions are received or by processing the action logs after the information is logged in the action log 445. The feature extractor 455 updates the active incremental feature store 480*a* based on the feature values or partial results of the feature values. The process of receiving user actions and updating the incremental feature store 480*a* is continued for a given time interval.

The scheduler 465 checks whether the length of time interval exceeds 530 a threshold value to determine whether to merge the partial results stored in the incremental feature store 480*a* with the feature values in the cumulative store 490. In another embodiment, the scheduler 465 may decide when to merge the partial results stored in the incremental feature store 480*a* with the feature values in the cumulative store 490 on other criteria, for example, based on whether the amount of information stored in the incremental feature store 480*a* exceeds a threshold value or whether the number of user actions received exceeds a threshold value.

If the scheduler 465 decides that the results in the incremental feature store 480*a* are ready to be merged with the feature values in the cumulative store 490, the scheduler 465 marks the incremental feature store 480*a* as inactive and the incremental feature store 480*a* as active. Accordingly, the status of the two incremental feature stores 480 is switched. In an embodiment, the feature manager 450 may allocate a new incremental feature store 480 for storing updates for the next time interval instead of switching between two incremental feature stores. For example, a incremental feature store may be selected from a pool of incremental feature stores. In an embodiment, a new incremental feature store may be allocated for each new time interval. The feature merger 475 merges the feature values from the incremental feature store 480*a* to the cumulative feature store 490. The above steps 510, 520, 530, 540, and 550 are repeated multiple times, for example, as long as the social networking system 200 is running. In an embodiment, the feature merger 475 is executed as a background thread that performs the merge operation.

Figure 6:
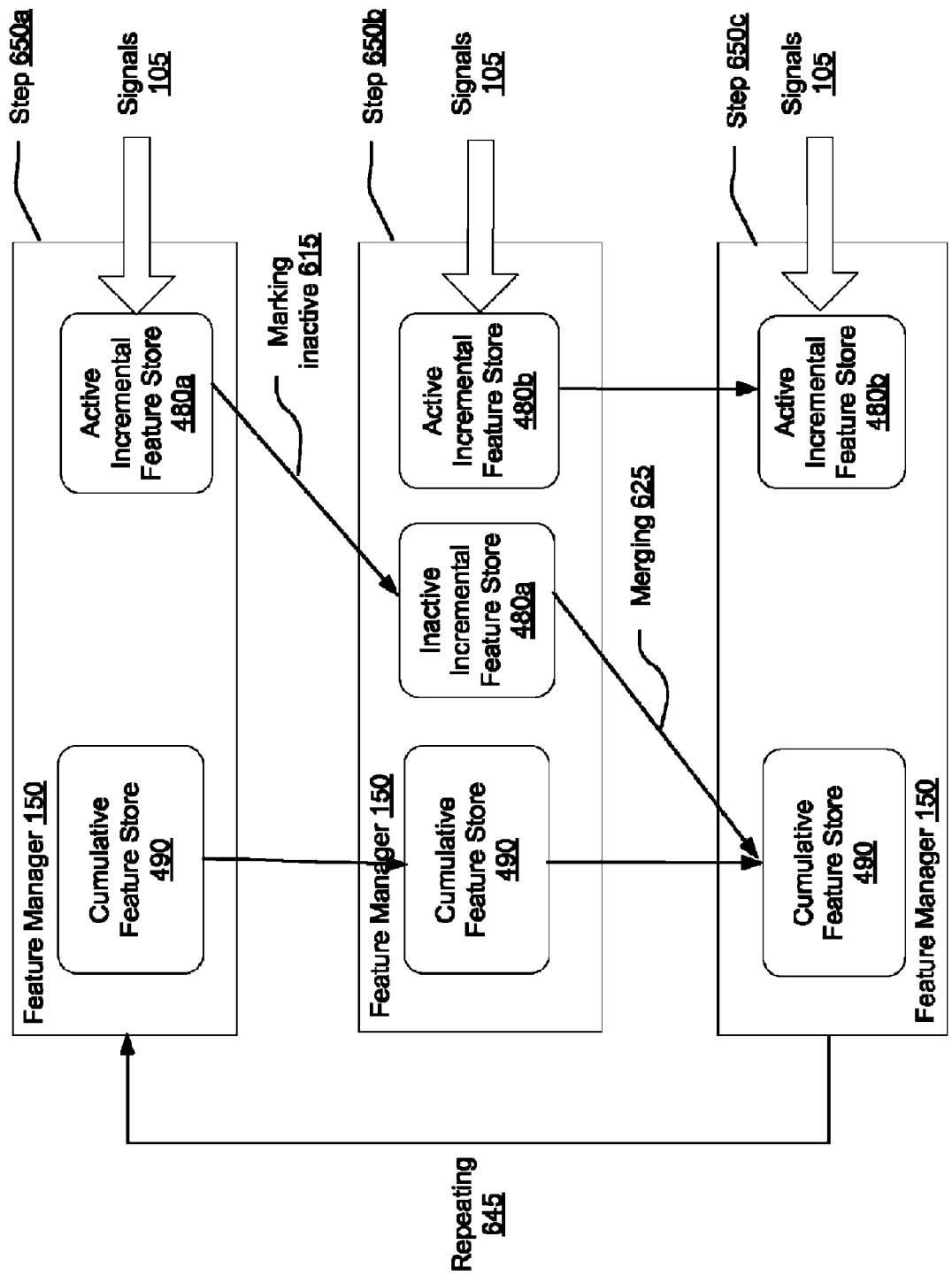
FIG. 6 is a diagram illustrating an active incremental feature store and an inactive incremental feature store for merging data with a cumulative incremental feature, in accordance with an embodiment of the invention.

FIG. 6 is a diagram illustrating an active incremental feature store and an inactive incremental feature store for merging data with a cumulative incremental feature, in accordance with an embodiment of the invention. The FIG. 6 shows the feature stores of the feature manager 150 through various steps. As shown in FIG. 6, in step 650*a*, the incremental feature store 480*a* is marked active and the signals 105 cause updates to the incremental feature store 480*a*.

In step 650*b*, the incremental feature store 480*a* is marked 615 as inactive and the incremental feature store 480*b* is marked as active. Accordingly the updates based on the signals 105 are performed to the incremental feature store 480*b* and the updates to the inactive incremental feature store 480*a* are stopped. In step 650*c*, the feature values from the inactive incremental feature store 480*a* are merged 625 to the cumulative feature store 490. During the merge 625 operation, the signals 105 cause updates to the incremental feature store 480*b*. The above process is repeated 645 multiple times, for example, while the social networking system 200 is running.

FIGS. 7A-7C illustrate the time intervals associated with a cumulative feature store and incremental feature stores, in accordance with an embodiment of the invention. FIG. 7A illustrates the time intervals corresponding to step 650*a* shown in FIG. 6. FIG. 7A shows a time line in which the time point 720*a* divides the time line into two time intervals, 710*a* and 710*b*. The time interval 710*a* corresponds to the time before time point 720*a* and the time interval 710*b* corresponds to the time after the time point 720*a*. The cumulative feature store 710*a* stores feature values determined using user actions that occurred during the time interval 710a. The incremental feature store 480a stores feature values determined using user actions that occurred during the time interval 710b and gets updated responsive to user actions currently occurring. The current time may be represented by a point occurring to the right of time point 720a and may be considered as moving along the time line towards the right.

When the current time point reaches 720b, the incremental feature store 480a is marked inactive and a new incremental feature store 480b is used as the active incremental feature store. FIG. 7B illustrates the time intervals corresponding to step 650b shown in FIG. 6. FIG. 7B shows a time line with three time intervals, time interval 710a that corresponds to time before time point 710a, time interval 710b' that corresponds to the time between the time points 710a and 710b, and time interval 710c that corresponds to time since time points 710b. The cumulative feature store 710a stores feature values determined using user actions that occurred during the time interval 710a'. The inactive incremental feature store 480a stores feature values determined using user actions that occurred during the time interval 710b' and the active incremental feature store 480b stores feature values determined using user actions that occurred during the time interval 710c and gets updated responsive to user actions currently occurring. FIG. 7C illustrates the time intervals corresponding to step 650c shown in FIG. 6.

FIG. 7C shows a time line with two time intervals, time interval 710a' that corresponds to time before time point 710b and time interval 710c corresponding to the time since time points 710b. In this step 650c, the incremental feature store 480a has been merged with the cumulative feature store 490. The cumulative feature store 710a stores feature values determined using user actions that occurred during the time interval 710a'. The active incremental feature store 480b stores feature values determined using user actions that occurred during the time interval 710c and gets updated responsive to user actions currently occurring.

Overall Process of Querying Feature Values

The request processor 470 receives requests for feature values and processes them. A request provides the information identifying the feature that is requested, for example, the request may identify a user associated with the feature value, a target entity associated with the feature value, and information identifying a type of the feature. The different feature stores 490, 480a, 480b store partial results corresponding to a particular feature values, each partial result determined using a set of user actions, for example, user actions occurring during a particular time interval. As an example, if a feature value is determined by aggregating values associated with user actions, the partial result value corresponding to a store may correspond to an aggregate value determined using all relevant actions within that store. Therefore, a the request processor 470 determines a feature value by combining partial results corresponding to the feature value obtained from each feature store 490, 480a, 480b. Certain feature stores may not have any partial result values corresponding to a feature, for example, if no relevant user actions occurred in the time interval corresponding to the feature store. In this situation, the request processor 470 combines partial results from the feature stores that have partial results for the feature value.

Figure 8:
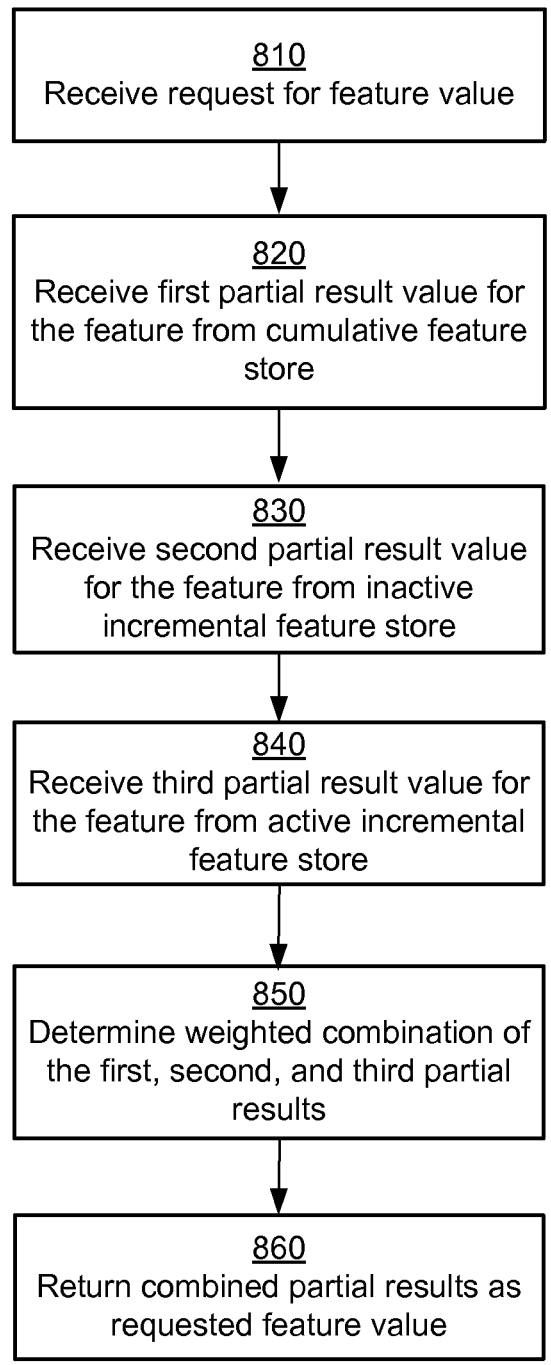
FIG. 8 illustrates an overall process for processing requests for feature values for a system maintaining an incremental feature store and a cumulative feature store, in accordance with an embodiment of the invention.

FIG. 8 illustrates the overall process for processing requests for feature values for a system maintaining an incremental feature store and a cumulative feature store, in accordance with an embodiment of the invention. The request processor 470 receives 810 a request for a feature value. The request processor 470 receives 820 a first partial result from the cumulative feature store 490 corresponding to the feature value. The first partial result is determined using the user actions for which the feature values in the cumulative feature store 490 have been updated. The request processor 470 receives 830 a second partial result from the incremental feature store 480a corresponding to the feature value. The second partial result is determined using the user actions for which the feature values in the incremental feature store 480a have been updated. The request processor 470 receives 840 a third partial result from the incremental feature store 480b corresponding to the feature value. The third partial result is determined using the user actions for which the feature values in the incremental feature store 480b have been updated. The request processor 470 determines 850 a weighted combination of the first partial result, the second partial result and the third partial result and returns 860 the combined partial results as the requested feature value.

The weighted combination determined 850 by the request processor weighs the partial results associated with the older user actions by a decay factor (also called the attenuation factor). This attenuates the effect of older user actions in the feature values. The decay factor is a value less than one, for example, 0.9. In an embodiment, each feature may be associated with a different decay factor. In an embodiment, each feature is associated with a half life and the decay factor for the feature determined based on the half life. For example, for certain features, older user actions may be more relevant compared to other features. If older user actions are more relevant, the decay factor may be larger resulting in slower decay of older user actions. On the other hand if older user actions are less relevant for the computation of a feature, the decay factor may be smaller resulting in faster decay of older user actions. In an embodiment, the decay factor value may be configurable.

The partial results for the requested feature may be available in a single incremental feature store and the cumulative feature store, for example, if the request for the feature is received during step 650a. The feature value f in this situation may be determined using the equation (1) where x represents the partial result obtained from the incremental feature store 480a and y represents the partial result obtained from the cumulative feature store 490, and α represents the decay factor.

$$f = x + \alpha \times y \tag{1}$$

The partial results for the requested feature may be available in a the incremental feature store 480a, the incremental feature store 480b, and the cumulative feature store, for example, if the request for the feature is received during step 650b. The feature value f in this situation may be determined using the equation (1) where x represents the partial result obtained from the incremental feature store 480a, y represents the partial result obtained from the cumulative feature store 490, z represents the partial result obtained from the incremental feature store 480b, α represents the decay factor for partial results from the incremental feature store 480a, and β represents the decay factor for partial results from the incremental feature store 480b.

$$f = x + \alpha + y + \beta \times z \tag{2}$$

The equation (1) corresponds to the computation performed for merging 550 feature values from incremental feature store 480 to the cumulative feature store 490 as illustrated in FIG. 5 or the merging 625 as illustrated in FIG. 6.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

For example, the predictor models can be generated and used in other types of online systems and are not limited to social networking systems. For example, an online system that stores user profiles and allows users to take actions can generate and user predictors for various actions that users can take. For example, an online system may allow users to receive feeds of various types of data. A predictor model may be developed for predicting whether a user is going to open a feed presented to the user. The predictor model can be used by the online system to order the feeds presented to the user, for example, the feeds may be ordered based on the likelihood that a user is going to open the feed or request additional information from the feed.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    maintaining, by an online system, a cumulative feature store and a pair of incremental feature stores, each of the cumulative and the incremental feature stores storing information describing features, each feature associated with a user, an entity represented in the online system, and a feature value based on user actions of the user associated with the entity;
    maintaining a status for each of the incremental feature stores, where one of the incremental feature stores has a status of active and another of the incremental feature stores has a status of inactive; and
    repeating an update cycle for updating the cumulative feature store, the update cycle comprising:
        swapping the statuses of the pair of incremental feature stores,
        updating the feature values in the cumulative feature store based on a corresponding feature values in the inactive incremental feature store, and
        responsive to receiving information about one or more user actions performed using the online system during the update cycle, updating the feature values in the active incremental feature store based on the received information.

2. The computer-implemented method of claim 1, further comprising:
    using a feature value for predicting future interactions between the user and a target entity associated with the feature.

3. The computer-implemented method of claim 1, wherein a feature is represented as an expression based on one or more of values describing user actions or other feature values.

4. The computer-implemented method of claim 1, wherein combining a feature value from the cumulative store with a corresponding feature value from the incremental store comprises decreasing the feature value from the cumulative store by a decay factor for combining the feature values.

5. The computer-implemented method of claim 4, wherein the decay factor value is determined based on a type of the feature being combined.

6. The computer-implemented method of claim 1, wherein the cumulative feature store stores feature values based on a first set of user actions and the inactive incremental feature store stores information based on a second set of user actions such that user actions in the first set occurred before user actions in the second set.

7. The computer-implemented method of claim 6, wherein the active incremental feature store stores information based on a third set of user actions such that user actions in the first set and the second set occurred before user actions in the third set.

8. The computer-implemented method of claim 1, wherein maintaining the cumulative feature store and incremental feature stores comprises storing feature values based on a first set of user actions in the cumulative feature store and storing feature values based on a second set of user actions in the incremental feature store such that user actions in the first set occurred before user actions in the second set.

9. The computer-implemented method of claim 1, further comprising:
    storing the incremental feature store in a data store that provides faster data access compared to a data store used for the cumulative feature store.

10. The computer-implemented method of claim 1, wherein the incremental feature store is stored in random access memory.

11. The computer-implemented method of claim 1, wherein receiving information describing user actions comprises, responsive to receiving multiple instances of user actions of a same type, storing information indicating a single instance of the user action of that type.

12. A computer-implemented method comprising:
maintaining, by an online system, a cumulative feature store and one or more incremental feature stores, each of the cumulative and the incremental feature stores storing information describing features, each feature associated with a user, an entity represented in the online system, and a feature value based on user actions of the user associated with the entity;
maintaining a status for each of the incremental feature stores, where an incremental feature store has a status of active; and
repeating an update cycle for updating the cumulative feature store, the update cycle comprising:
marking the incremental feature store as inactive,
marking another incremental feature store as active,
updating the feature values in the cumulative feature store based on a corresponding feature values in the inactive incremental feature store, and
responsive to receiving information about one or more user actions performed using the online system during the update cycle, updating the feature values in the incremental feature store based on the received information,
using the other incremental feature store as the incremental feature store for the next update cycle.

13. The computer-implemented method of claim 12, wherein each update cycle comprises switching the other incremental feature store and the incremental feature store.

14. The computer-implemented method of claim 12, wherein each update cycle comprises allocating a new incremental feature store as the other incremental feature store.

15. The computer-implemented method of claim 12, wherein each update cycle comprises receiving an incremental store from a pool of incremental stores.

16. The computer-implemented method of claim 12, wherein combining a feature value from the cumulative store with a corresponding feature value from the incremental store comprises decreasing the feature value from the cumulative store by a decay factor for combining the feature values.

17. The computer-implemented method of claim 12, wherein maintaining the cumulative feature store and incremental feature stores comprises storing feature values based on a first set of user actions in the cumulative feature store and storing feature values based on a second set of user actions in the incremental feature store such that user actions in the first set occurred before user actions in the second set.

18. A computer program product having a non-transitory computer-readable storage medium storing computer-executable code, the code comprising:
a feature manager module of an online system configured to:
maintain a cumulative feature store and a pair of incremental feature stores, each of the cumulative and the incremental feature stores storing information describing features, each feature associated with a user, an entity represented in the online system, and a feature value based on user actions of the user associated with the entity;
maintain a status for each of the incremental feature stores, where one of the incremental feature stores has a status of active and the other of the incremental feature stores has a status of inactive; and
repeat an update cycle for updating the cumulative feature store, the update cycle comprising:
swapping the statuses of the pair of incremental feature stores,
updating the feature values in the cumulative feature store based on a corresponding feature values in the inactive incremental feature store, and
responsive to receiving information about one or more user actions performed using the online system during the update cycle, updating the feature values in the active incremental feature store based on the received information.

19. The computer program product of claim 18, wherein combining a feature value from the cumulative store with a corresponding feature value from the incremental store comprises decreasing the feature value from the cumulative store by a decay factor for combining the feature values.

20. The computer program product of claim 18, wherein maintaining the cumulative feature store and incremental feature stores comprises storing feature values based on a first set of user actions in the cumulative feature store and storing feature values based on a second set of user actions in the incremental feature store such that user actions in the first set occurred before user actions in the second set.

* * * * *